United States Patent
Blondel et al.

(10) Patent No.: US 7,750,110 B2
(45) Date of Patent: Jul. 6, 2010

(54) FLEXIBLE SEMICRYSTALLINE POLYAMIDES

(75) Inventors: Philippe Blondel, Bernay (FR); Thibaut Montanari, Menneval (FR); Annett Linemann, Nassandres (FR); Nicolas Amouroux, Valailles (FR); Henri Decraemer, Beaumontel (FR)

(73) Assignee: Arkema France, Colombes (FR)

( * ) Notice: Subject to any disclaimer, the term of this patent is extended or adjusted under 35 U.S.C. 154(b) by 1115 days.

(21) Appl. No.: 11/243,532

(22) Filed: Oct. 5, 2005

(65) Prior Publication Data
US 2006/0074158 A1     Apr. 6, 2006

Related U.S. Application Data

(60) Provisional application No. 60/632,418, filed on Dec. 2, 2004.

(30) Foreign Application Priority Data
Oct. 5, 2004    (FR) .................................. 04 10481

(51) Int. Cl.
*C08G 69/08* (2006.01)
(52) U.S. Cl. ........................ 528/310; 528/323; 528/324; 528/325; 528/326; 528/328; 528/329.1
(58) Field of Classification Search ................ 528/310, 528/323, 324, 325, 326, 328, 329.1
See application file for complete search history.

(56) References Cited

U.S. PATENT DOCUMENTS

| | | | |
|---|---|---|---|
| 5,219,003 A | 6/1993 | Kerschbaumer | |
| 5,459,230 A * | 10/1995 | de Jong et al. | 528/310 |
| 5,989,385 A * | 11/1999 | Oeltjen et al. | 156/330.9 |
| 7,175,896 B2 | 2/2007 | Schmitz et al. | |
| 2002/0082352 A1 | 6/2002 | Schmitz et al. | |
| 2002/0128386 A1 | 9/2002 | Montanari et al. | |
| 2004/0059056 A1 | 3/2004 | Montanari et al. | |

FOREIGN PATENT DOCUMENTS

GB    2390658    1/2004

OTHER PUBLICATIONS

Brule, "Permeability of Polymer Alloys", Kunststoffe Apr. 2004 pp. 102-105.

\* cited by examiner

*Primary Examiner*—Edward J Cain
(74) *Attorney, Agent, or Firm*—Thomas F. Roland

(57) ABSTRACT

The invention relates to a composition, and structures having a layer made of said composition, in which the composition is, by weight, the total being 100%:

50 to 100% of at least one polyamide A1 of formula X.Y/Z or 6.Y2/Z in which:
X denotes the residues of an aliphatic diamine having from 6 to 10 carbon atoms,
Y denotes the residues of an aliphatic dicarboxylic acid having from 10 to 14 carbon atoms,
Y2 denotes the residues of an aliphatic dicarboxylic acid having from 15 to 20 carbon atoms and
Z denotes at least one unit chosen from the residues of a lactam, the residues of an α,ω-aminocarboxylic acid, the unit X1,Y1 in which X1 denotes the residues of an aliphatic diamine and Y1 denotes the residues of an aliphatic dicarboxylic acid, the weight ratios $Z/(X+Y+Z)$ and $Z/(6+Y2+Z)$ being between 0 and 15%;

0 to 40% of a plasticizer;
0 to 50% of an impact modifier; and
0 to 50% of a polyamide A2.

3 Claims, No Drawings

FLEXIBLE SEMICRYSTALLINE POLYAMIDES

This application claims benefit, under U.S.C. §119(a) of French National Application Number 04.10481, filed Oct. 5, 2004, and also claims benefit, under U.S.C. §19(e) of U.S. provisional application 60/632,418, filed Dec. 2, 2004, incorporated herein by reference.

FIELD OF THE INVENTION

The present invention relates to flexible semicrystalline polyamides. They are useful for manufacturing parts, by extrusion or injection moulding, that are resistant to the fluids used in motor vehicles and to solvents.

BACKGROUND OF THE INVENTION

The polyamide nylon-12 (PA-12), because of its remarkable mechanical properties and its resistance to petrol, oil and greases is widely used in motor vehicles and heavy goods vehicles. Because of the developments in engines and a change in their environment, there is now a requirement for thermoplastics that can be used at temperatures of 20 to 30° C. above the operating temperatures of PA-12, while still maintaining good flexibility, impact strength, chemical resistance and good convertibility in extrusion. Polyamides having a higher melting point than PA-12 are known, such as for example PA-6, PA-6,6, PA-4,6, PA-6,10, PA-6,12 and PA-10,10. However, the problem not solved at the present time is that these pure PAs are not flexible enough.

Patent EP 1 038 921 describes polyamide-based thermoplastic compositions comprising, by weight:
  50 to 99% of a polyamide;
  1 to 50% of a catalyzed polyamide;
  0 to 40% of a plasticizer;
  0 to 60%, preferably 0 to 30%, of a flexible modifier;
the total being 100%.

These compositions are useful for manufacturing, for example, flexible hoses. The examples relate only to PA-11 and PA-12, but other homopolyamides and copolyamides are mentioned in the description.

Patent Application US 2002-0019477 describes, in the examples, moulding materials comprising PA-6,12 with acid end groups, PA-6,12 with amine end groups, a grafted EPR (grafted by maleic anhydride), an ethylene/alkyl acrylate/glycidyl methacrylate copolymer and a plasticizer (BBSA). Other homopolyamides and copolyamides are mentioned in the description.

Patent Application US 2002-0082352 describes polyamide-based compositions to be used in multilayer structures. The examples describe compositions comprising high-viscosity PA-12, a polyamine/polyamide copolymer and either a grafted SEBS or a blend of an ethylene/propylene block copolymer and of a grafted polypropylene. Other homopolyamides and copolyamides are mentioned in the description.

Patent Application US 2002-0119272 describes polyamide-based compositions to be used in multilayer structures. One of the layers comprises:
  a polyamide chosen from PA-6, PA-6,6 and PA-6/6,6;
  a polyamine-polyamide;
  optionally, a polyamide chosen from PA-11, PA-12, PA-6,12, PA-10,12 and PA-12,12.

A composition has now been found that is based on a polyamide resulting from the chain linking of a diamine having from 6 to 10 carbon atoms, of a diacid having from 10 to 12 carbon atoms and, optionally, of at least one monomer chosen from lactams, α,ω-aminocarboxylic acids, diamines and diacids, this composition being able to be used at temperatures of 20 to 30° C. above the operating temperatures of PA-12, while still maintaining good flexibility, impact strength, chemical resistance and good convertibility in extrusion.

SUMMARY OF THE INVENTION

The present invention relates to a composition comprising, by weight, the total being 100%:
  50 to 100% of at least one polyamide A1 of formula X.Y/Z or 6.Y2/Z in which:
    X denotes the residues of an aliphatic diamine having from 6 to 10 carbon atoms,
    Y denotes the residues of an aliphatic dicarboxylic acid having from 10 to 14 carbon atoms,
    Y2 denotes the residues of an aliphatic dicarboxylic acid having from 15 to 20 carbon atoms and
    Z denotes at least one unit chosen from the residues of a lactam, the residues of an α,ω-aminocarboxylic acid, the unit X1.Y1 in which X1 denotes the residues of an aliphatic diamine and Y1 denotes the residues of an aliphatic dicarboxylic acid, the weight ratios $Z/(X+Y+Z)$ and $Z/(6+Y2+Z)$ being between 0 and 15%;
  0 to 40% of a plasticizer;
  0 to 50% of an impact modifier; and
  0 to 50% of a polyamide A2.

Advantageously, the inherent viscosity of the polyamide A1 is between 0.5 and 2 and preferably between 0.8 and 1.8.

The advantage of these compositions is the low water uptake, which does not exceed 3.5% and advantageously 3% by weight. Another advantage compared with PA-6 is the good zinc chloride resistance.

The proportion of Z is sufficient to lower the crystallinity of the PA-X,Y and of the PA-6,Y2 and to facilitate the addition of plasticizer or of impact modifier, but not too high so as not to obtain a copolyamide having a melting point below that of PA-12.

Advantageously the composition comprises, by weight, the total being 100%:
  55 to 100% of at least one polyamide A1,
  0 to 40% of a plasticizer;
  0 to 45% of an impact modifier; and
  0 to 45% of a polyamide A2.

In a preferred embodiment the composition comprises, by weight, the total being 100%:
  55 to 100% of at least one polyamide A1,
  0 to 20% of a plasticizer;
  0 to 45% of an impact modifier; and
  0 to 45% of a polyamide A2.

In a preferred embodiment the composition comprises, by weight, the total being 100%:
  55 to 100% of at least one polyamide A1,
  0 to 10% of a plasticizer;
  0 to 10% of an impact modifier; and
  0 to 45% of a polyamide A2.

In a more preferred embodiment the composition comprises, by weight, the total being 100%:
  55 to 95% of at least one polyamide A1,
  0 to 20% of a plasticizer;
  0 to 45% of an impact modifier; and
  0 to 45% of a polyamide A2,
  the total of the plasticizer, the impact modifier and the polyamide A2 being 5 to 45%.

In a more preferred embodiment the composition comprises, by weight, the total being 100%:
  55 to 85% of at least one polyamide A1,
  0 to 20% of a plasticizer;
  0 to 45% of an impact modifier; and
  0 to 45% of a polyamide A2,
  the total of the plasticizer, the impact modifier and the polyamide A2 being 15 to 45%.

In a more preferred embodiment the composition comprises, by weight, the total being 100%:
  55 to 80% of at least one polyamide A1,
  0 to 20% of a plasticizer;
  0 to 45% of an impact modifier; and
  0 to 45% of a polyamide A2,
  the total of the plasticizer, the impact modifier and the polyamide A2 being 20 to 45%.

In a more preferred embodiment the composition comprises, by weight, the total being 100%:
  55 to 80% of at least one polyamide A1,
  4 to 20% of a plasticizer;
  5 to 25% of an impact modifier; and
  0 to 36% of a polyamide A2,
  the total of the plasticizer, the impact modifier and the polyamide A2 being 20 to 45%.

In another preferred embodiment the composition comprises, by weight, the total being 100%:
  70 to 95% of at least one polyamide A1,
  0 to 20% of a plasticizer;
  0 to 30% of an impact modifier; and
  0 to 30% of a polyamide A2,
  the total of the plasticizer, the impact modifier and the polyamide A2 being 5 to 30%.

In another preferred embodiment the composition comprises, by weight, the total being 100%:
  70 to 95% of at least one polyamide A1,
  5 to 20% of a plasticizer;
  0 to 30% of an impact modifier; and
  0 to 30% of a polyamide A2,
  the total of the plasticizer, the impact modifier and the polyamide A2 being 5 to 30%.

The present invention also relates to the composition of the invention in the form of a powder and to its use for coating articles. The powder can be made by cryogenic grinding of pellets or by dissolving pellets in ethanol and then precipitated as described in U.S. Pat. No. 4,334,056. This powder is useful in processes for covering an article with a film arising from the melting of a thin layer of powder deposited beforehand on the article.

At the present time, several industrial processes for covering an article by melting a powder exist.

The first process is electrostatic powder coating, which consists in charging the powder with static electricity and in bringing it into contact with the article to be covered, which is at zero potential. For example, the powder is injected into an electrostatic spray gun which charges the said powder by the corona effect, by triboelectrification or by a combination of both. The powder thus charged is sprayed onto the object to be covered, which is at zero potential. According to another form of electrostatic powder coating, the article at zero potential is immersed in a fluidized bed of charged powder. Within the fluidized bed is powder with which it is desired to cover the article. This powder is in the form of small solid particles, for example with a size between 0.01 and 1 mm (advantageously between 10 and 200 µm), of any shape, which are in a state of fluidization within the bed owing to the presence of air or any other gas. The powder may be charged by electrodes, by the corona effect, or by any device placed inside and/or outside the fluidized bed in order to charge it by the triboelectric effect. The article covered with powder is then placed in an oven at a temperature high enough to provide a coating, by melting the powder and causing a film to be formed.

The second process consists in preheating the object to be covered to a temperature above the melting point of the powder. Once the article is hot, it is immediately immersed in a fluidized bed of the powder, the powder melts on contact with the hot article and forms a film. A solid covering is thus provided. This process is also called the "fluidized-bed dip coating" process. The powder paint of the present invention can be used in both processes.

By way of example a polyamide 10.10/6 in which the caprolactame is 10% by weight of the 10.10/6 is made by polycondensation, the melting point is 183° C. and the film of coating can be made under 190° C. It will not be outside of the invention to add stabilizers against hydrolysis such as carbidiimides (Stabaxol® made by Rhein Chemie) or any other stabilizer or usual additives.

The compositions of the invention can also be used in a solvent to make varnishes or coatings. The article is covered with the solvent containing the polyamide, then the solvent is recovered and the article is coated by the polyamide. The solvent can be alcohols or aromatics such as butanediol, benzilic alcohol, meta cresol, toluene, phenol, xylene or mixture thereof. More preferred are the PA 6.10/Z blended with a polyamide A2. Preferably A2 is PA 12. Z is advantageously 10 to 15%. The proportions A1/A2 are 60/40 to 70/30 and advantageously around 65/35. By way of example a PA 6.10/6.6 in which Z is 15 blended with PA 12 such as PA 6.10/6.6 is 65% (by weight) and PA 12 is 35% has a melting point of 155° C. and an inherent viscosity of 0.6 dl/g (deciliters per gram) measured in meta cresol at 20° C. according to ISO 307 (1994). The compositions of the invention are soluble between 1 to 30%, advantageously 1-25% by weight in hot solvents. These solutions are stable at ambient temperatures more than 60 days.

The composition of the invention may also contain a thermoplastic polyolefin such as, for example, HDPE, LDPE or LLDPE.

Advantageously the polyamide A1 is PA-6,y in which 6 denotes the residues of hexamethylene diamine and y denotes the residues of an aliphatic dicarboxylic acid having from 10 to 18 carbon atoms.

More advantageously, the polyamide A1 is PA-6,10 (having hexamethylenediamine and sebacic acid units), PA-6,12 (having hexamethylenediamine and dodecanedioic acid units), PA-6,14 (having hexamethylenediamine and C14 acid units), PA-6,18 ((having hexamethylenediamine and C18 acid units) and PA-10,10 (having 1,10-decanediamine and sebacic acid units).

The present invention also relates to structures comprising a layer consisting of the above composition. That is to say the structure may either be a monolayer, and therefore consisting of a layer of the above composition, or a multilayer, and therefore comprising a layer consisting of the above composition. This structure is useful for making devices for storing or transferring of fluids, in particular in motor vehicles and heavy goods vehicles. The fluids may be, for example, petrol, diesel, hydraulic brake fluid, compressed air for the brake circuits of heavy goods vehicles, and hydraulic clutch fluid. The invention also relates to these devices. Such devices may be tanks, hoses, pipes, containers. These structures may include other layers consisting of other materials.

One advantage of the compositions of the invention compared with PA-12 is the 20 to 30° C. higher operating temperature and the improved heat ageing.

Another advantage is that, in a multilayer structure, the composition of the invention in which X is hexamethylenediamine and Y is sebacic acid adheres to PA-6 (or blends having a PA-6 matrix) and to EVOH. The EVOH layer may contain an impact modifier (for example EPR or EPDM, optionally grafted). Thus, in a structure consisting of the following successive layers (starting with the outer layer):

(1) PA-6,y/PA-6 or a blend having a PA-6 matrix;
(2) PA-6,y/EVOH/PA-6 or a blend having a PA-6 matrix;
(3) PA-6,y/EVOH/PA-6,y;
(4) PA-6,y/PA-6 or a blend having a PA-6 matrix/EVOH/ PA-6 or a blend having a PA-6 matrix;
(5) PA-6,y/PA-6 or a blend having a PA-6 matrix/EVOH/ PA-6 or a blend having a PA-6 or a PA-6,y matrix.

It is unnecessary to have a tie layer between the outer layer and the next layer. However, it is possible to place this tie layer between the outer layer and the next layer in order to reinforce the structure.

The direct adhesion of PA-6,10 to EVOH is, however, effective only if the EVOH has a sufficient ethylene content. For the same ethylene content of the EVOH, the adhesion to PA-6,10 is greater than to PA-6,12. To be able to use EVOHs with a low ethylene content, it will be preferred to use the structure (4) or the structure (5).

DETAILED DESCRIPTION OF THI

With regard to the polyamide A1 and firstly "X", the diamine may be a straight-chain $\alpha,\omega$-diamine. It may be branched or a mixture of a linear (straight chain) diamine and of a branched diamine.

With regard to "Y", the diacid may be a straight-chain $\alpha,\omega$-diacid. It may be branched or a mixture of a linear (straight chain) diacid and of a branched diacid. Advantageously Y contains from 10 to 12 carbon atoms.

With regard to "Z", its proportion is sufficient to lower the crystallinity of the PA-X,Y and to make it easier to add plasticizer or impact modifier, but not too high so as not to obtain a copolyamide having a melting point below that of PA-12. This proportion is at most 15%, however, depending on the nature of the constituents of Z, it may vary—a person skilled in the art can readily check the lowering of the crystallinity by carrying out a DSC (differential scanning calorimetry) measurement on the PA-X,Y and then on the PA-X, Y/Z. Advantageously, the proportion of Z is between 0 and 10% and preferably between 1 and 5%. The lactam may be chosen from caprolactam and lauryllactam. The number of carbon atoms of X1 may be between 6 and 14. The number of carbon atoms of Y1 may be between 6 and 14.

The polyamide A1 is manufactured using known techniques for the production of polyamides.

With regard to the plasticizer, this is chosen from benzenesulphonamide derivatives, such as N-butylbenzenesulphonamide (BBSA), ethyltoluenesulphonamide or N-cyclohexyltoluenesulphonamide; esters of hydroxybenzoic acids, such as 2-ethylhexyl-para-hydroxybenzoate and 2-decylhexyl-para-hydroxybenzoate; esters or ethers of tetrahydrofurfuryl alcohol, like oligoethoxylated tetrahydrofurfuryl alcohol; and esters of citric acid or hydroxymalonic acid, such as oligoethoxylated malonate. Mention may also be made of decylhexyl-para-hydroxybenzoate and ethylhexyl-para-hydroxybenzoate. One particularly preferred plasticizer is N-butylbenzenesulphonamide (BBSA).

With regard to the impact modifier, mention may be made, for example, of polyolefins, crosslinked polyolefins, EPR, EPDM, SBS and SEBS elastomers, it being possible for these elastomers to be grafted in order to make it easier to compatibilize them with the polyamide, copolymers having polyamide blocks and polyether blocks. These copolymers having polyamide blocks and polyether blocks are known per se—they are also called PEBAs (polyether-block-amides). Mention may also be made of acrylic elastomers, for example those of the NBR, HNBR or X-NBR type. Described in detail below are crosslinked polyolefins and then polyolefins.

As regards the crosslinked polyolefins, this phase can originate (i) from the reaction of two polyolefins having groups which react with one another, (ii) from maleated polyolefins with a monomeric, oligomeric or polymeric diamino molecule, (iii) or from one (or more) unsaturated polyolefin carrying unsaturation and which can be crosslinked, for example, by the peroxide route. As regards the reaction of two polyolefins, this crosslinked phase originates, for example, from the reaction:

of a product (A) comprising an unsaturated epoxide,
of a product (B) comprising an unsaturated carboxylic acid anhydride,
optionally of a product (C) comprising an unsaturated carboxylic acid or of an $\alpha,\omega$-aminocarboxylic acid.

As regards the crosslinked polyolefins, mention may be made, as examples of product (A), of those comprising ethylene and an unsaturated epoxide.

According to a first form of the invention, (A) is either an ethylene unsaturated epoxide copolymer or a polyolefin grafted by an unsaturated epoxide.

As regards the polyolefin grafted by an unsaturated epoxide, the term "polyolefin" is understood to mean polymers comprising olefin units, such as, for example, ethylene, propylene, 1-butene or all other $\alpha$-olefin units. Mention may be made, by way of example, of:

polyethylenes, such as LDPE, HDPE, LLDPE or VLDPE, polypropylene, ethylene/propylene copolymers, EPRs (ethylene-propylene rubber) or else metallocene PEs (copolymers obtained by single-site catalysis), styrene/ethylene-butylene/styrene (SEBS) block copolymers, styrene/butadiene/styrene (SBS) block copolymers, styrene/isoprene/styrene (SIS) block copolymers, styrene/ethylene-propylene/styrene (SEPS) block copolymers or ethylene-propylene-diene monomer (EPDM) terpolymers;

copolymers of ethylene with at least one product chosen from salts or esters of unsaturated carboxylic acids or vinyl esters of saturated carboxylic acids.

Advantageously, the polyolefin is chosen from LLDPE, VLDPE, polypropylene, ethylene/vinyl acetate copolymers or ethylene/alkyl (meth)acrylate copolymers. The density may advantageously be between 0.86 and 0.965 and the melt flow index (MFI) may be between 0.3 and 40 (in g/10 min at 190° C./2.16 kg).

As regards the ethylene unsaturated epoxide copolymers, mention may be made, for example, of copolymers of ethylene with an alkyl(meth)acrylate and with an unsaturated epoxide or copolymers of ethylene with a saturated carboxylic acid vinyl ester and with an unsaturated epoxide. The amount of epoxide may be up to 15% by weight of the copolymer and the amount of ethylene at least 50% by weight.

Advantageously, (A) is an ethylene alkyl (meth)acrylate unsaturated epoxide copolymer.

Preferably, the alkyl (meth)acrylate is such that the alkyl has 2 to 10 carbon atoms.

The MFI (melt flow index) of (A) may, for example, be between 0.1 and 50 (g/10 min at 190° C./2.16 kg).

Examples of alkyl acrylates and methacrylates that may be used are in particular methyl methacrylate, ethyl acrylate, n-butyl acrylate, isobutyl acrylate and 2-ethylhexyl acrylate. Examples of unsaturated epoxides that may be used are in particular:

aliphatic glycidyl esters and ethers, such as allyl glycidyl ether, vinyl glycidyl ether, glycidyl maleate, glycidyl itaconate, glycidyl acrylate and glycidyl methacrylate, and alicyclic glycidyl esters and ethers, such as 2-cyclohexene-1-yl glycidyl ether, diglycidyl cyclohexene-4,5-dicarboxylate, glycidyl cyclohexene-4-carboxylate, glycidyl 5-norbornene-2-methyl-2-carboxylate and diglycidyl endo-cis-bicyclo[2.2.1]hept-5-ene-2,3-dicarboxylate.

According to another form of the invention, the product (A) is a product having two epoxide functional groups, such as, for example, bisphenol A diglycidyl ether (BADGE).

Mention may be made, as examples of product (B), of those comprising ethylene and an unsaturated carboxylic acid anhydride.

(B) is either an ethylene unsaturated carboxylic acid anhydride copolymer or a polyolefin grafted by an unsaturated carboxylic acid anhydride.

The polyolefin may be chosen from the polyolefins mentioned above which have to be grafted by an unsaturated epoxide.

Examples of unsaturated dicarboxylic acid anhydrides that may be used as constituents of (B) are in particular maleic anhydride, itaconic anhydride, citraconic anhydride and tetrahydrophthalic anhydride.

Mention may be made, as examples, of copolymers of ethylene, of an alkyl (meth)acrylate and of an unsaturated carboxylic acid anhydride and copolymers of ethylene, of a saturated carboxylic acid vinyl ester and of an unsaturated carboxylic acid anhydride.

The amount of unsaturated carboxylic acid anhydride may be up to 15% by weight of the copolymer and the amount of ethylene at least 50% by weight.

Advantageously, (B) is a copolymer of ethylene with an alkyl(meth)acrylate and with an unsaturated carboxylic acid anhydride. Preferably, the alkyl(meth)acrylate is such that the alkyl has 2 to 10 carbon atoms. The alkyl(meth)acrylate may be chosen from those mentioned above. The MFI of (B) may, for example, be between 0.1 and 50 (g/10 min at 190° C./2.16 kg).

It would not be outside the scope of the invention if a portion of the copolymer (B) were to be replaced with an ethylene/acrylic acid copolymer or an ethylene/maleic anhydride copolymer, the maleic anhydride having been completely or partially hydrolysed. These copolymers may also comprise an alkyl(meth)acrylate. This portion may represent up to 30% of (B).

According to another form of the invention, (B) can be chosen from aliphatic, alicyclic or aromatic polycarboxylic acids or their partial or complete anhydrides.

Mention may be made, as examples of aliphatic acids, of succinic acid, glutaric acid, pimelic acid, azelaic acid, sebacic acid, adipic acid, dodecanedicarboxylic acid, octadecanedicarboxylic acid, dodecenesuccinic acid and butanetetracarboxylic acid.

Mention may be made, as examples of alicyclic acids, of cyclopentanedicarboxylic acid, cyclopentanetricarboxylic acid, cyclopentanetetracarboxylic acid, cyclohexanedicarboxylic acid, hexanetricarboxylic acid, methylcyclopentanedicarboxylic acid, tetrahydrophthalic acid, endo-methyl-enetetrahydrophthalic acid and methyl-endo-methylenetetrahydrophthalic acid.

Mention may be made, as examples of aromatic acids, of phthalic acid, isophthalic acid, terephthalic acid, trimellitic acid, trimesic acid or pyromellitic acid.

Mention may be made, as examples of anhydrides, of the partial or complete anhydrides of the above acids.

Use is advantageously made of adipic acid.

With regard to the product (C) comprising an unsaturated carboxylic acid, mention may be made, as examples, of the products (B) completely or partly hydrolysed. (C) is, for example, an ethylene unsaturated carboxylic acid copolymer and advantageously an ethylene(meth)acrylic acid copolymer.

Mention may also be made of ethylene alkyl(meth)acrylate acrylic acid copolymers. These copolymers have for example an MFI of between 0.1 and 50 (g/10 min at 190° C./2.16 kg).

The amount of acid may be up to 10% by weight and preferably 0.5 to 5%. The amount of (meth)acrylate is for example from 5 to 40% by weight.

(C) may also be chosen from $\alpha,\omega$-aminocarboxylic acids, such as, for example, $NH_2$—$(CH_2)_5COOH$, $NH_2$—$(CH_2)_{10}COOH$ and $NH_2(CH_2)_{11}$—$COOH$ and preferably aminoundecanoic acid.

The proportion of (A) and (B) necessary to form the crosslinked phase is determined according to the usual rules of the art by the number of reactive functional groups present in (A) and in (B).

For example, in the crosslinked phases comprising (C) chosen from $\alpha,\omega$-aminocarboxylic acids, if (A) is an ethylene alkyl(meth)acrylate unsaturated epoxide copolymer and (B) an ethylene alkyl(meth)acrylate unsaturated carboxylic acid anhydride copolymer, the proportions are such that the ratio of the anhydride functional groups to the epoxy functional groups is in the region of 1.

The amount of $\alpha,\omega$-aminocarboxylic acid is then from 0.1 to 3% and preferably 0.5 to 1.5% of (A) and (B).

As regards (C) comprising an unsaturated carboxylic acid, that is to say (C) being chosen, for example, from ethylene/alkyl(meth)acrylate/acrylic acid copolymers, the amount of (C) and (B) may be chosen so that the number of acid functional groups and of anhydride functional groups is at least equal to the number of epoxide functional groups and, advantageously, products (B) and (C) are used such that (C) represents 20 to 80% by weight of (B) and preferably 20 to 50%.

It would not be outside the scope of the invention if a catalyst were added. These catalysts are generally used for the reactions between the epoxy groups and the anhydride groups.

Mention may in particular be made, among the compounds capable of accelerating the reaction between the epoxy functional group present in (A) and the anhydride or acid functional group present in (B), of:

tertiary amines, such as dimethyllaurylamine, dimethylstearylamine, N-butylmorpholine, N,N-dimethylcyclohexylamine, benzyldimethylamine, pyridine, 4-(dimethylamino)pyridine, 1-methylimidazole, tetramethylethylhydrazine, N,N-dimethylpiperazine, N,N,N',N'-tetramethyl-1,6-hexanediamine or a mixture of tertiary amines having from 16 to 18 carbons and known under the name of dimethyltallowamine 1,4-diazabicyclo[2.2.2]octane (DABCO)

tertiary phosphines, such as triphenylphosphine zinc alkyldithiocarbamates.

The amount of these catalysts is advantageously from 0.1 to 3% and preferably 0.5 to 1% of (A)+(B)+(C).

As regards the noncrosslinked polyolefins, mention may be made of the polyolefins described in the preceding section and intended to be grafted by reactive groups. Mention may also be made of the products (A) or (B) or (C) of the preceding section but used alone in order not to crosslink.

With regard to the polyamide A2, this is a polyamide which is not the identical as A1 but could be chosen in the same family of A1. Mention may be made of PA 11, PA 6 and PA 12. In a specific embodiment this is a polyamide containing a polycondensation catalyst, such as an organic or mineral acid, for example phosphoric acid. The catalyst may be added to the polyamide A2 after it has been prepared by any process or quite simply, and as is preferred, it may be the residue of the catalyst used for its preparation. The term "catalyzed polyamide" means that the chemistry will be continued beyond the steps for synthesizing the base resin and therefore during the subsequent steps in the preparation of the compositions of the invention. Polymerization and/or depolymerization reactions may very substantially take place during the blending of the polyamides A1 and A2 to prepare the compositions of the present invention. Typically, the Applicant believes (without being tied down by this explanation) that polymerization is continued (by chain extension) and that the chains become branched (for example by bridging via phosphoric acid). In addition, this may be considered as a tendency towards re-equilibration of the polymerization equilibrium, and therefore a kind of homogenization. However, it is recommended that the polyamides be thoroughly dried (and advantageously their moisture content properly controlled) in order to avoid any depolymerization. The amount of catalyst may be between 5 ppm and 15000 ppm of phosphoric acid relative to A2. The amount of catalyst may be up to 3000 ppm relative to the amount of polyamide A2 and advantageously between 50 and 1000 ppm. In the case of other catalysts, for example boric acid, the contents will be different and may be chosen appropriately depending on the usual techniques for the polycondensation of polyamides. Advantageously, A2 is chosen from PA-11, PA 6 and PA-12.

With regard to the proportions of A1, of the plasticizer, of the impact modifier and of A2, these may vary widely.

For example, to make compressed-air hoses useful in the brake circuits of heavy goods vehicles, the plasticizer is (by weight) between 5 and 20% (advantageously between 10 and 15%), the impact modifier between 0 and 5%, the polyamide A2 between 0 and 5% and the balance made of polyamide A1. Preferably, A1 is PA-10,10 or PA6,y. This composition exhibits good impact strength and burst strength after ageing.

For example, to make hoses useful in hydraulic clutch circuits for automobiles and heavy goods vehicles, the plasticizer is (by weight) between 0 and 5%, the impact modifier between 0 and 5%, the polyamide A2 between 0 and 35% and the balance made of polyamide A1. Preferably A1 is PA-6,y. These hoses have a high pressure resistance. The presence of A2 makes it possible to increase the toughness and lifetime, but to the detriment of the burst strength.

For example, to make hoses useful for conveying petrol or diesel from the motor-vehicle tank to the injection device and back, the plasticizer is (by weight) between 4 and 10% (advantageously between 4 and 8%), the impact modifier between 5 and 15% (advantageously between 8 and 12%), the polyamide A2 between 10 and 20% (advantageously between 12 and 17%) and the balance made of polyamide A1. Advantageously, the impact modifier is a crosslinked polyolefin. Advantageously, A1 is PA-6,y or PA-10,10 Advantageously, these hoses include other layers, such as those made of for example PA-6, a blend of PA-6 and a polyolefin having a PA-6 matrix, EVOH, fluoropolymer, polyester, aliphatic polyketone or PPS.

With regard to the preparation of the compositions of the invention, these may be prepared by melt-blending the constituents using the standard techniques for thermoplastics.

The compositions according to the invention may additionally include at least one additive chosen from:
dyes;
pigments;
brighteners;
antioxidants;
fire retardants;
UV stabilizers;
nanofillers;
nucleating agents.

With regard to the multilayer structures, mention may be made of the following:

Structure (a) comprising:
a layer of the composition of the invention and a layer of another polyamide, a coextrusion tie possibly being placed between them;

Structure (b) comprising:
a layer of the composition of the invention between two polyamide layers, a coextrusion tie possibly being placed between two or more of these layers (by way of example mention may be made of a layer of PA 11 or PA 12, a layer of the composition of the invention, a layer of PA 6);

Structure (c) comprising, in succession:
a layer of the composition of the invention, optionally a tie layer, a layer chosen from fluoropolymers (for example PVDF), PPS, EVOH, aliphatic polyketones and polyesters, optionally a tie layer, and a layer of the composition of the invention;

Structure (d) comprising, in succession:
a layer of the composition of the invention, optionally a tie layer, a layer chosen from fluoropolymers (for example PVDF), PPS, EVOH, aliphatic polyketones and polyesters, optionally a tie layer, and a polyamide layer;

Structure (e) comprising, in succession:
a layer of the composition of the invention, optionally a tie layer, a layer chosen from fluoropolymers (for example PVDF), PPS, EVOH, aliphatic polyketones and polyesters.

The above structures may be used for any fluids, including petrol and diesel. In the above structures, one or more of the layers may contain conducting substances in order to make them antistatic. In the above structures, it is possible to add a layer that contains conductive substances in order to render it antistatic and thus render the structure antistatic. Advantageously, these structures are used to make devices for transferring or storing fluids and advantageously the layer mentioned first is the outer layer, the layer mentioned last is the layer in contact with the stored or transported fluid. According to one possible form, the layer in contact with the fluid takes the form of two layers of the same composition except the one in contact with the fluid, which contains conductive substances in order to make it antistatic and thus render the structure antistatic. In the above structures and those in the rest of the text, the conductor may be carbon black or carbon fibres or carbon nanotubes. It is advantageous to use a carbon black chosen from those having a BET specific surface area, measured according to the ASTM D3037-89 standard, of 5 to 200 $m^2/g$, and a DBP absorption, measured according to the ASTM D 2414-90 standard, of 50 to 300 ml/100 g. This is described in Application WO 99/33908, the proportions of carbon black are in general between 17 and 30% by weight and preferably around 23-26%.

With regard more particularly to petrol, structures are used that comprise, in addition to a layer of a composition of the invention, one or more layers chosen from PA-6, EVOH and PA-6/polyolefin blends having a PA-6 matrix.

The PA-6 may include elastomers such as EPR or EPDM, or very low-density polyethylene, these products possibly being grafted by a functional monomer in order to make them compatible with the PA-6.

In a preferred embodiment the PA-6/polyolefin blends having a PA-6 matrix comprise, the total being 100%:

50 to 90% (advantageously 60 to 80%) of PA-6;
1 to 30% (advantageously 10 to 25%) of HDPE; and
5 to 30% (advantageously 10 to 20%) of at least one polymer P1 chosen from impact modifiers and polyethylenes, at least one of HDPE and P1 being completely or partly functionalized.

Advantageously, the impact modifier is chosen from elastomers and very low-density polyethylenes.

With regard to the impact modifier and firstly to the elastomers, mention may be made of SBS, SIS and SEBS block polymers, and ethylene-propylene (EPR) or ethylene-propylene-diene monomer (EPDM) elastomers. As regards the very low-density polyethylenes, these are, for example, metallocenes with a density of, for example, between 0.860 and 0.900.

Advantageously, an ethylene-propylene (EPR) or ethylene-propylene-diene monomer (EPDM) elastomer is used. The functionalization may be provided by grafting or copolymerization with an unsaturated carboxylic acid. It would not be outside the scope of the invention to use a functional derivative of this acid. Examples of unsaturated carboxylic acids are those having 2 to 20 carbon atoms, such as acrylic, methacrylic, maleic, fumaric and itaconic acids. The functional derivatives of these acids comprise, for example, anhydrides, ester derivatives, amide derivatives, imide derivatives and metal salts (such as alkali metal salts) of the unsaturated carboxylic acids.

Unsaturated dicarboxylic acids having 4 to 10 carbon atoms and their functional derivatives, particularly their anhydrides, are particularly preferred grafting monomers. It is advantageous to use maleic anhydride.

The proportion of functionalized HDPE and/or functionalized P1 relative to the combination of functionalized or unfunctionalized HDPE and functionalized or unfunctionalized P1 may be between 0 and 70%, advantageously between 5 and 60% and preferably between 20 and 60% by weight.

The PA-6/polyolefin blends having a PA-6 matrix may be prepared by melt-blending the various constituents in machines commonly used in the thermoplastic polymer industry.

According to a first form of these PA-6/polyolefin blends having a PA-6 matrix, the HDPE is not grafted and P1 is a grafted elastomer/ungrafted elastomer blend.

According to another form of these PA-6/polyolefin blends having a PA-6 matrix, the HDPE is not grafted and P1 is a grafted polyethylene optionally blended with an elastomer.

In the PA-6/polyolefin blends having a PA-6 matrix, it would not be outside the scope of the invention to replace the PA-6 completely or partly with PA-6,10/Z of the invention. This is also valid in the case of the structures given below.

By way of example, mention may be made of the following structures in which the inner layer is in contact with the petrol or diesel:

Structure (f) comprising, in succession from the outside inwards:
 a layer of the composition of the invention (advantageously PA-6,y), optionally a tie layer, a PA-6 layer or a layer of a PA-6/polyolefin blend having a PA-6 matrix; optionally the inner layer contains a conductor.

Structure (g) Comprising, in Succession from the Outside Inwards:
 a layer of the composition of the invention (advantageously PA-6,y), optionally a tie layer, a PA-6 layer or a layer of a PA-6/polyolefin blend having a PA-6 matrix, a PA-6 layer or a layer of a PA-6/polyolefin blend having a PA-6 matrix and containing a conductor;

Structure (h) Comprising, in Succession from the Outside Inwards:
 a layer of the composition of the invention (advantageously PA-6,y), optionally a tie layer, a PA-6 layer or a layer of a PA-6/polyolefin blend having a PA-6 matrix, an EVOH layer, a PA-6 layer or a layer of PA-6/polyolefin blend having a PA-6 matrix;

Structure (h1) Comprising, in Succession from the Outside Inwards:
 a layer of the composition of the invention (advantageously PA-6,y), optionally a tie layer, a PA-6 layer or a layer of a PA-6/polyolefin blend having a PA-6 matrix, an EVOH layer, a PA-6 layer or a layer of PA-6/polyolefin blend having a PA-6 matrix, a PA-6 layer or a layer of a PA-6/polyolefin blend having a PA-6 matrix and containing a conductor;

Structure (i) Comprising, in Succession from the Outside Inwards:
 a layer of the composition of the invention (advantageously PA-6,y), optionally a tie layer, a PA-6 layer or a layer of a PA-6/polyolefin blend having a PA-6 matrix, an EVOH layer, a PA-6 layer or a layer of a PA-6/polyolefin blend having a PA-6 matrix and containing a conductor;

Structure (j) Comprising, in Succession from the Outside Inwards:
 a layer of the composition of the invention (advantageously PA-6,y), optionally a tie layer optionally containing an impact modifier, an EVOH layer, a PA-6 layer or a layer of a PA-6/polyolefin blend having a PA-6 matrix and optionally containing a conductor;

Structure (k) Comprising, in Succession from the Outside Inwards:
 a layer of the composition of the invention (advantageously PA-6,y), optionally a tie layer optionally containing an impact modifier, an EVOH layer, a PA-6 layer or a layer of a PA-6/polyolefin blend having a PA-6 matrix, a PA-6 layer or a layer of a PA-6/polyolefin blend having a PA-6 matrix and containing a conductor; and Structure (l) Comprising, in Succession from the Outside Inwards:
 a layer of the composition of the invention (advantageously PA-6,y), optionally a PA-6 layer or a layer of a PA-6/polyolefin blend having a PA-6 matrix, an EVOH layer, optionally a PA-6 layer or a layer of a PA-6/polyolefin blend having a PA-6 matrix, a layer of the composition of the invention (advantageously PA-6,y) optionally containing a conductor.

In structures (j) and (k), the tie may be a copolyamide or a blend of copolyamides, and it optionally contains an impact modifier (for example an optionally grafted EPR or EPDM).

EXAMPLES

Example 1

Plasticized PA-10,10 for Compressed-Air Brake Applications

Composition: PA-10,10 (86.4%) +13% BBSA+0.6% Polyad PB201.

Polyad PB201 denotes an inorganic antioxidant based on copper iodide.

This formulation was tested and compared with the values of the DIN 73378 PHLY standard. The moduli were evaluated on the injection-moulded material and the burst strength and impact strength values were evaluated on an extruded tube with inside/outside diameters of 6 and 8 mm. The table below shows that the plasticized PA-10,10 meets this standard as regards modulus, burst strength and impact strength after ageing. The value of the burst strength at 140° C. is greater than the requirements at 130° C.

| Property | Standard | Value | DIN 73378 PHLY |
|---|---|---|---|
| Tensile modulus after moulding (MPa) | ISO 527 | 550 | 450-600 |
| Flexural modulus after conditioning* (MPa) | ISO 178 | 480 | |
| 23° C. burst strength (MPa) | DIN 73378 | 30 | >27 |
| 100° C. burst strength (MPa) | DIN 73378 | 14.5 | >0.43* (23° C. value) = 12.9 |
| 130° C. burst strength (MPa) | DIN 73378 | 10.5 | >0.31* (23° C. value) = 9.3 |
| 140° C. burst strength (MPa) | DIN 73378 | 9.5 | |
| −40° C. impact strength on tube after 72 h at 150° C. | DIN 73378 | 0 breaks in 10 | No breaks at 23° C. |

*conditioning at 23° C./50% RH for 15 days.

Example 2

PA-6,10 and PA-6,12 for hydraulic (clutch) pipe applications. In the table below the proportion of polyamide represents the balance to 100%. PA-11 denotes a catalyzed PA-11 containing 600 ppm of phosphoric acid.

| | Standard | PA-6,12 + 0.6% Polyad PB201 | PA-6,12 + 30% PA-11 + 0.6% Polyad PB201 | PA-6,10 + 0.6% Polyad PB201 | PA-6,10 + 30% Pa11 + 0.6% Polyad PB201 | PA-12 T6L black AESN |
|---|---|---|---|---|---|---|
| Flexural modulus (MPa) | ISO 178 | 1500 | 1030 | 1220 | 1010 | 1280 |
| Tensile modulus (MPa) | ISO 527 | 2030 | 1470 | 1840 | 1490 | 1500 |
| 23° C. burst strength (MPa) | DIN 73378 | 55 | 40 | 54 | 44 | 47 |
| 140° C. burst strength (MPa) | DIN 73378 | 14 | 10 | 16 | 12 | 9.5 (12 MPa at 120° C.) |
| 23° C. Charpy notched impact strength (kJ/m$^2$) | ISO 179 | 7 | 11 | 9 | 13 | 15 |
| −40° C. Charpy notched impact strength (kJ/m$^2$) | ISO 179 | 5.5 | 8 | 6.5 | 10.5 | 8 |
| Half-life/140° C. thermal ageing in air (hours) | Atofina method* | 250 | >1200 | 900 | >1200 | 2500 |

*time after which the elongation of the test piece is reduced by a factor of 2 relative to the initial value (injection-moulded test piece).

The above table shows that the PA-6,10 and the PA-6,12 may be advantageously used instead of PA-12 for a hydraulic application, where high pressure resistance is necessary (for example, for a clutch fluid tube). PA-6,10 has advantages in terms of hot burst strength, impact strength and high-temperature ageing compared with PA-6,12. The addition of PA-11 increases the toughness and the lifetime, but to the detriment of the burst strength.

Example 3

Multilayer for a Petrol Line

The following tubular structures with an inside diameter of 6 mm and a wall thickness of 1 mm were produced using the following products:

PA-6,10 denotes a PA-6,10 comprising 10% of a crosslinked phase LT, 15% of catalyzed PA-11 containing 600 ppm of phosphoric acid, 5% of BBSA and 0.6% of Polyad PB201 (the total being 100%). The crosslinked phase LT results from blending:

5% Lotader® 4700+2.5% Lotader® AX8900+2.5% Lucalen® A 3110M.

Lotader® 4700 is an ethylene/ethyl acrylate/maleic anhydride copolymer containing 30% acrylate by weight and 1.5% MAH, and having an MFI of 7g/10 min at 190° C./2.16 kg. Lotader® AX8900 is an ethylene/methyl acrylate/glycidyl methacrylate copolymer containing 25% acrylate and 8% GMA by weight and having an MFI of 6 g/10 min at 190° C./2.16 kg. Lucalen® A 3110M denotes an ethylene/butyl acrylate/acrylic acid copolymer having an 88/8/4 composition by weight (sold by BASF).

Conductive PA-6,10 denotes the above PA-6,10 to which an amount of carbon black is added so that the black content is 22% by weight relative to the weight of conductive PA-6,10. Its surface resistivity is between $10^2$ and $10^6$ ohms/ measured using the SAEJ2260 standard.

EVOH32 denotes an EVOH copolymer containing 32 mol % ethylene, sold under the name Soarnol® DC3203F by Nippon Goshei.

EVOH44 denotes an EVOH copolymer containing 44 mol % ethylene sold under the name Soarnol® AT4403 by Nippon Goshei.

Orgalloy® denotes a 70% PA-6/15% HDPE/15% grafted EPR blend, which also contains antioxidants.

Conductive Orgalloy® denotes the previous Orgalloy® to which an amount of carbon black is added so that the black content is 22% by weight relative to the weight of conductive Orgalloy®. Its surface resistivity is between $10^2$ and $10^6$ ohms/measured according to the SAEJ2260 standard. The carbon black was supplied by 3M under the name "Ensaco 250 Granular"; the DBP absorption is 190 ml/g and the BET surface area about 65 m²/g.

Structure 1: PA-6,10 (500 μm) outer layer/Orgalloy® (500 μm);

Structure 2: PA-6,10 (500 μm) outer layer/Orgalloy® (400 μm)/conductive Orgalloy® (100 μm);

Structures 1 and 2 have a reduced permeability and excellent temperature resistance, the melting point of PA-6,10 and of Orgalloy® being 220° C.

Structures 2, 5 and 6 have a conductive internal layer, which makes it possible to remove any static electricity generated by friction of the petrol on the polymer.

The advantage of these structures is the absence of a tie between the polyamide nylon-6,10 and the Orgalloy®, and the use of Orgalloy® as a tie between the PA-6,10 and the EVOH. The same structures have also been produced, but with PA-6,12 instead of PA-6,10. The peel force needed to separate the PA-6,10 or the PA-6,12 from the Orgalloy® is greater than 50 N/cm (25 mm/min peel at room temperature).

Structure 6 was produced without an Orgalloy® layer between the PA-6,10 and the EVOH. To have sufficient adhesion, it is necessary in this case to use an EVOH with a high ethylene content. Structures 3 and 4 may be produced in the same way with the Orgalloy® and EVOH 32 internal layers replaced with a single layer of Soarnol AT4403.

Example 4

The following table shows that the flexural modulus can be lowered very significantly with this type of formulation, while still maintaining good thermomechanical properties and excellent ageing. In this table, "LT" and "PA-11" have the same meanings as in Example 3. The PA-6,10 exhibits interesting behaviour compared with the PA-6,12 with the same formulation: lower modulus but higher high-temperature burst strength. These materials may be used as petrol or diesel lines made of a monolayer or multilayer tube (Example 3).

| Formulations | Standard | PA-6,12 + 10% LT + 15% PA-11 + 5% BBSA + 0.6% Polyad PB201 | PA-6,10 + 10% LT + 15% PA-11 + 5% BBSA + 0.6% Polyad PB201 | PA-10,10 + 10% LT + 15% PA-11 + 5% BBSA + 0.6% Polyad PB201 |
|---|---|---|---|---|
| Flexural modulus (MPa) | ISO 178 | 590 | 505 | 390 |
| Tensile modulus (MPa) | ISO 527 | 790 | 755 | 505 |
| 23° C. burst strength (MPa) | DIN 73378 | 31 | 31 | 25 |
| 140° C. burst strength (MPa) | DIN 73378 | 9.5 | 10.5 | 7 |
| −40° C. Charpy notched impact strength (kJ/m²) | ISO 179 | 7.5 | 8 | 5.5 |
| Half-life/140° C. thermal ageing in air (hours) | Atofina method* | >1200 | >1200 | >1200 |

*time after which the elongation of the test piece is reduced by a factor of 2 relative to the initial value (injection-moulded test piece).

Structure 3: PA-6,10 (375 μm) outer layer/Orgalloy® (100 μm)/EVOH32 (100 μm)/Orgalloy® (425 μm);

Structure 4: PA-6,10 (375 μm)/Orgalloy® (100 μm)/ EVOH32 (100 μm)/Orgalloy® (325 μm)/conductive Orgalloy® (100 μm);

Structure 5: PA-6,10 (350 μm)/Orgalloy® (100 μm)/ EVOH32 (100 μm)/Orgalloy® (100 μm)/conductive PA-6, 10 (350 μm); and Structure 6: PA-6,10 (350 μm)/EVOH44 (300 μm)/conductive PA-6,10 (350 μm).

The PA-6,10 is resistant to zinc chloride. This type of line can therefore be used under the chassis of motor vehicles.

Structures 3 to 6 have a markedly lower permeability to petrol containing ethanol than the polyamide nylon-6,10 alone.

What is claimed is:

1. A composition comprising, by weight, the total being 100%:

50 to 100% of at least one polyamide A1 of formula X.Y/Z or 6.Y2/Z in which:

"6" denotes the residues of hexamethylene diamine,

X denotes the residues of an aliphatic diamine having from 6 to 10 carbon atoms, Y denotes the residues of an aliphatic dicarboxylic acid having from 10 to 14 carbon atoms, Y2 denotes the residues of an aliphatic dicarboxylic acid having from 15 to 20 carbon atoms and Z denotes at least one unit chosen from the residues of a lactam, the residues of an α,ω-aminocarboxylic acid, the unit X1.Y1 in which X1 denotes the residues of an aliphatic diamine and Y1 denotes the residues of an aliphatic dicarboxylic acid, the weight ratios Z/(X+Y+Z) and Z/(6+Y2+Z) being between 1 and 15%;
4-10% of a plasticizer;
5-15% of an impact modifier; and
10-20% of a polyamide A2.

2. The composition according to claim 1, wherein the plasticizer comprises between 4 and 8% by weight, the impact modifier comprises between 8 and 12% by weight, and the polyamide A2 comprises between 12 and 17% by weight.

3. The composition according to claim 1, wherein the impact modifier is a crosslinked polyolefin.

* * * * *